United States Patent [19]

Marsico, Jr. et al.

[11] 3,760,082

[45] Sept. 18, 1973

[54] COMPOSITIONS CONTAINING 5-AMINO-3-ETHYL-1-PHENYL-4-PYRAZOLECARBOXAMIDES AND METHODS OF USING THE SAME

[75] Inventors: Joseph William Marsico, Jr., Pearl River; Joseph Peter Joseph, Cliffside Park; Leon Goldman, Nanuet, all of N.Y.

[73] Assignee: American Cyanamid Company, Stamford, Conn.

[22] Filed: May 1, 1972

[21] Appl. No.: 248,990

[52] U.S. Cl............................. 424/273, 260/310 R
[51] Int. Cl............................................. A61k 27/00
[58] Field of Search.................. 424/273; 260/310 R

[56] References Cited

UNITED STATES PATENTS

| | | | |
|---|---|---|---|
| 3,169,091 | 2/1965 | Gordon et al. | 260/310 R |
| 3,277,100 | 10/1966 | Dickinson | 260/310 R |
| 3,398,158 | 8/1968 | Fusco et al. | 260/310 R |

Primary Examiner—Stanley J. Friedman
Attorney—Ernest Y. Miller

[57] ABSTRACT

The methods of using compounds 5-amino-3-ethyl-1-phenyl-4-pyrazolecarboxamide and 5-amino-3-ethyl-1-(m-fluorophenyl)-4-pyrazolecarboxamide in compositions containing these compounds and a pharmaceutically acceptable carrier, are described. They are useful as analgetic agents in warm-blooded animals.

5 Claims, No Drawings

COMPOSITIONS CONTAINING 5-AMINO-3-ETHYL-1-PHENYL-4-PYRAZOLECARBOXAMIDES AND METHODS OF USING THE SAME

DESCRIPTION OF THE INVENTION

The active components of this invention are 5-amino-3-ethyl-1-phenyl-4-pyrazolecarboxamides of the formula:

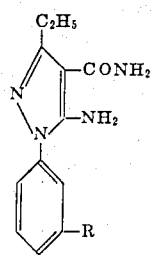

wherein R is hydrogen or fluoro, and non-toxic acid-addition salts with acids such as hydrobromic, hydrochloric, phosphoric, sulfuric, citric, tartaric and the like.

The therapeutic components of the present invention are colorless crystalline solids which are soluble in organic solvents such as methanol, ethanol, acetone, ethyl acetate, benzene, propylene glycol and the like, but only very slightly soluble in water. The salts are soluble in water and in hydroxylic solvents.

The active components of the present invention are prepared by the reaction sequence shown as follows:

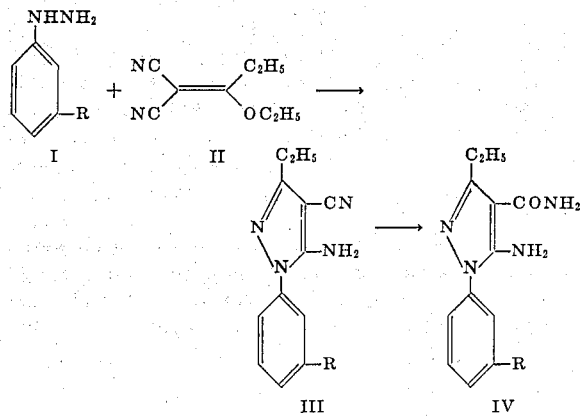

wherein R is hydrogen or fluoro.

The hydrazine (I) is condensed with (1-ethoxy-propylidene)malonitrile (II) in an organic solvent such as ethanol to yield the 5-amino-3-ethyl-1-phenyl-4-pyrazolecarbonitrile (III) which is hydrolyzed to produce the desired 5-amino-3-ethyl-1-phenyl-4-pyrazolecarboxamide (IV). The hydrazine (I) may be used as the free base in the reaction or may be generated in situ by utilizing a mixture of the hydrazine (I) hydrochloride and sodium acetate. The hydrolysis of the carbonitrile (III) to the carboxamide (IV) may be accomplished with sodium hydroxide or with concentrated sulfuric acid.

The 5-amino-3-ethyl-1-phenyl-4-pyrazolecarboxamides of the present invention are highly active analgetic agents in warm-blooded animals. They are useful in doses ranging from about 1 to 100 mg. per kilogram per day of warm-blooded animal.

The preferred range of dose is usually 5 to 20 mg. per kilogram per day.

For therapeutic administration, the 5-amino-3-ethyl-1-phenyl-4-pyrazolecarboxamides of this invention may be incorporated with excipients and used, for example, in the form of tablets, dragees, capsules, suppositories, liquids, elixirs, emulsions, suspensions, syrups, chocolate, candy, wafers, chewing gum, solutions for parenteral administration, or the like. Such compositions and preparations should contain at least 0.1 percent of the active compound. The percentage in the composition and preparations may, of course, be varied, and may conveniently be between about 2 percent and 60 percent or more of the weight of the unit. The amount of a 5-amino-3-ethyl-1-phenyl-4-pyrazolecarboxamide in such therapeutically useful compositions or preparations is such that a suitable dosage will be obtained. This dosage can also be obtained by the use of sustained release preparations. Preferred compositions or preparations according to the present invention are prepared so that a dosage unit form contains between about 1 and about 250 milligrams of a 5-amino-3-ethyl-1-phenyl-4-pyrazolecarboxamide.

Tablets, pills, dragees, and the like may contain the following: a binder such as gum tragacanth, acacia, corn starch, or gelatin; a disintegrating agent such as corn starch, potato starch, alginic acid, or the like; a lubricant such as stearic acid, magnesium stearate, talc or the like; a sweetening agent such as sucaryl or saccharin may be added, as well as a flavoring such as peppermint, oil of wintergreen or cherry flavoring.

The active components of the present invention are active as analgetic agents when measured by the "writhing syndrome" test for analgetic activity as described by Siegmund et. al., *Proceedings of the Society for Experimental Biology and Medicine*, Vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3-minute period commencing 15 minutes after injection of the phenyl-p-quinone. A compound is considered active if it reduces the total number of writhes in two test mice from a control value of approximately 30 per pair to a value of 18 or less. The following Table summarizes the relative activity of the present compounds as active analgetics, and compares them with the reference drug aspirin.

| Compound | Dose (Oral) mg./kg. of Body Weight | Number of Writhes Pair No. 1 | Pair No. 2 |
|---|---|---|---|
| 5-Amino-3-ethyl-1-phenyl-4-pyrazolecarboxamide | 100 | 0 | 3 |
| 5-Amino-3-ethyl-1-(m-fluorophenyl)-4-pyrazolecarboxamide | 100 | 4 | 8 |
| Aspirin | 100 | 1 (historical average) | |

Experiments are conducted to determine analgesia by a modification of the method of Randall and Selitto (Arch. Int. Pharmacodyn., 111:409–419, 1957). This method is used to measure the pain threshold of rats whose paws were made sensitive to pressure by injection of a 20 percent aqueous suspension (0.1 ml.) of brewers yeast into the plantar surface of the left hind paw. The pressure in grams which, when applied to the inflamed paw, elicits a sudden struggle or vocalization is recorded. A maximum (cutoff) pressure of 250 grams is employed. Control rats respond at a pressure of about 25 grams. A ratio of post/pretreatment reaction thresholds is calculated. The following Table summarizes the results.

| Compound | Oral Dose mg./kg. of Body Weight | Post-treatment/Pre-treament Pressure threshold (Average of 8 Rats Each Time Period) Hours After treatment | | | |
|---|---|---|---|---|---|
| | | 1 | 2 | 4 | 6 |
| 5-Amino-3-ethyl-1-phenyl-4-pyrazolecarboxamide | 200 | 3.7 | 1.8 | 1.7 | |
| 5-Amino-3-ethyl-1-(m-fluorophenyl)-4-pyrazolecarboxamide | 200 | | 1.9 | 2.7 | 1.4 |
| 5-Amino-1-(p-fluorophenyl)-4-pyrazolecarboxamide | 200 | 1.1 | 1.4 | 2.1 | 1.1 |
| Aspirin | 200 | 1.1 | 1.1 | 1.6 | 1.0 |

These results show that the compounds of this invention have a more rapid onset and higher efficacy for analgesia than 5-amino-1-(p-fluorophenyl)-4-pyrazolecarboxamide (disclosed in prior art) and aspirin.

DETAILED DESCRIPTION

This invention is described in greater detail in conjunction with the following specific examples showing preparation of the present compounds and compositions containing the same.

EXAMPLE 1

Preparation of 5-Amino-3-ethyl-1-phenyl-4-pyrazolecarbonitrile

A mixture of 22.5 g. of (1-ethoxypropylidene)-malononitrile, 21.7 g. of phenylhydrazine hydrochloride and 12.3 g. of sodium acetate in 300 ml. of absolute ethanol is heated under reflux for 24 hours. The solvent is removed under reduced pressure to give an oil which crystallizes on trituration with hexane. The crystals are removed by filtration, dissolved in methylene chloride, washed with water, dried over anhydrous magnesium sulfate and filtered through magnesium silicate to remove most of the color. Evaporation of the solvent under reduced pressure gives 20.3 g. of pink solid, melting point 130°–132°C. Recrystallization of a 5.0 g. sample from acetone-hexane gives 4.0 g. of 5-amino-3-ethyl-1-phenyl-4-pyrazolecarbonitrile as colorless crystals, melting point 132°–133°C.

EXAMPLE 2

Preparation of 5-Amino-3-ethyl-1-phenyl-4-pyrazolecarboxamide

To 3.5 ml. of stirred concentrated sulfuric acid is added, portionwise, 1.0 g. of pulverized 5-amino-3-ethyl-1-phenyl-4-pyrazolecarbonitrile. The reaction mixture is stirred 1 hour longer and then poured onto ice water. A small amount of starting material separates and is removed by filtration. The filtrate is made basic with concentrated ammonium hydroxide and the resulting colorless crystals are removed by filtration, washed with water and dried to give 0.77 g. of product, melting point 152°–154°C. Recrystallization from acetone-hexane gives 0.60 g. of 5-amino-3-ethyl-1-phenyl-4-pyrazolecarboxamide as colorless crystals, melting point 155°–156°C.

EXAMPLE 3

Preparation of 5-Amino-3-ethyl-1-(m-fluorophenyl)-4-pyrazolecarbonitrile

A mixture of 24.4 g. of m-fluorophenylhydrazine hydrochloride, 22.5 g. of (1-ethoxypropylidene)-malononitrile and 12.3 g. of anhydrous sodium acetate in 300 ml. of absolute ethanol is refluxed for 23 hours, cooled and filtered. The filtrate is evaporated under reduced pressure to give a brown gummy residue. Crystallization from benzene gives, after filtration and washing with benzene, 22.2 g. of light tan crystals, melting point 128°–131°C. Recrystallization of a 5.00 g. sample from 50 ml. of benzene using activated charcoal gives 3.24 g. of 5-amino-3-ethyl-1-(m-fluorophenyl)-4-pyrazolecarbonitrile as colorless crystals, melting point 130°–132°C.

EXAMPLE 4

Preparation of 5-Amino-3-ethyl-1-(m-fluorophenyl)-4-pyrazolecarboxamide

A mixture of 6.50 g. of 5-amino-3-ethyl-1-(m-fluorophenyl)-4-pyrazolecarbonitrile, 140 ml. of 2N sodium hydroxide and 140 ml. of absolute ethanol is heated under reflux for 6.5 hours and then evaporated under reduced pressure until an oil separates. A few drops of ethanol are added and crystallization occurs. After chilling, the nearly colorless crystals are removed by filtration, washed with water and air-dried to give 5.25 g. of product, melting point 114°–116°C. The crystals are dissolved in dichloromethane and chromatographed over silica gel. The column is eluted with ether (200 ml. cuts) and cuts 3–9 are combined and the solvent is removed by evaporation under reduced pressure. The residual crystalline solid (4.37 g.) is recrystallized from acetone-hexane to give 2.79 g. of 5-amino-3-ethyl-1-(m-fluorophenyl)-4-pyrazolecarboxamide as colorless crystals, melting point 124.5°–126°C.

EXAMPLE 5

Preparation of 50 gm. Tablets

| Per Tablet | | For 10,000 Tablets |
|---|---|---|
| 0.050 g. | 5-Amino-3-ethyl-1-(m-fluorophenyl)-4-pyrazolecarboxamide | 500 g. |
| 0.080 | Lactose | 800 |
| 0.010 | Corn Starch (For Mix) | 100 |
| 0.008 | Corn Starch (For Paste) | 80 |
| 0.148 g. (total) | | (total) 1480 g. |
| 0.002 g. | Magnesium Stearate | 20 |
| 0.150 (total) | | (total) 1500 g. |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1 percent magnesium stearate and compressed into tablets in a suitable tableting machine.

EXAMPLE 6

Preparation of Oral Syrup

| Ingredients | Amount |
|---|---|
| 5-Amino-3-ethyl-1-phenyl-4-pyrazole-carboxamide | 500 mg. |
| Sorbitol solution (70% N.F.) | 40 ml. |
| Sodium benzoate | 150 mg. |
| Saccharin | 10 mg. |
| Red Dye (F.D. & C. NO. 2) | 10 mg. |
| Cherry Flavor | 50 mg. |
| Distilled water, q.s. ad | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 7

Preparation of Parenteral Solution

In a solution of 700 ml. of propylene glycol and 200 ml. of water for injection is dissolved 20.0 g. of 5-amino-3-ethyl-1-phenyl-4-pyrazolecarboxamide with stirring. After dissolution is complete, hydrochloric acid is added to adjust the pH to 5.5 and the volume is made up to 1000 ml. with distilled water. The formulation is filtered through a 0.22 micron sterilizing filter, filled into 5.0 ml. ampoules, each containing 2.0 ml. (representing 40 mg. of drug), and sealed under nitrogen.

EXAMPLE 8

The following table shows the superiority of the present compound 1 and 2 over closely related compounds.

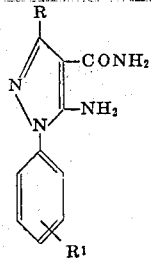

ANALGETIC ACTIVITY

| | R | R¹ | Anti-Writhing | Peak C/T | Paw Pain Time (hours) |
|---|---|---|---|---|---|
| 1. | $C_2H_5$ | H | Accept | 3.7 | 1 |
| 2. | $C_2H_5$ | m-F | Accept | 2.7 | 2 |
| 3. | H | H | Reject | — | — |
| 4. | H | p-F | Accept | 2.1 | 4 |
| 5. | H | p-Cl | Accept | Reject | |
| 6. | H | m-Cl | Accept | Reject | |
| 7. Aspirin | | | Accept | 1.6 | 4 |

I claim:

1. A method of treating pain in a warm-blooded animal which comprises administering internally to said warm-blooded animal an analgetic composition of an effective amount of a compound of the formula:

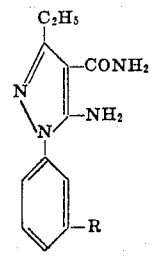

wherein R is hydrogen or fluoro, or a non-toxic acid addition salt thereof, in association with a pharmaceutically acceptable carrier.

2. The method according to claim 1, wherein the compound is 5-amino-3-ethyl-1-phenyl-4-pyrazolecarboxamide.

3. The method according to claim 1, wherein the compound is 5-amino-3-ethyl-1-(m-fluorophenyl)-4-pyrazolecarboxamide.

4. A therapeutic composition having analgetic activity in a warm-blooded animal which comprises a pharmaceutically acceptable carrier and from 1 to 250 mg. of a compound selected from the group consisting of 5-amino-3-ethyl-1-phenyl-4-pyrazolecarboxamide and 5-amino-3-ethyl-1-(m-fluorophenyl)-4-pyrazolecarboxamide and a non-toxic acid addition salt thereof.

5. The therapeutic composition according to claim 4, wherein the active component is 5-amino-3-ethyl-1-phenyl-4-pyrazolecarboxamide.

* * * * *